(12) United States Patent
Nakaiwa et al.

(10) Patent No.: US 8,440,056 B2
(45) Date of Patent: May 14, 2013

(54) HEAT INTEGRATED DISTILLATION APPARATUS

(75) Inventors: Masaru Nakaiwa, Tsukuba (JP); Toshihiro Wakabayashi, Narashino (JP); Akihiko Tamakoshi, Narashino (JP)

(73) Assignees: National Institute of Advanced Industrial Science and Technology, Tokyo (JP); Toyo Engineering Company, Tokyo (JP)

( * ) Notice: Subject to any disclaimer, the term of this patent is extended or adjusted under 35 U.S.C. 154(b) by 0 days.

(21) Appl. No.: 13/386,624

(22) PCT Filed: Sep. 24, 2010

(86) PCT No.: PCT/JP2010/066498
§ 371 (c)(1),
(2), (4) Date: Jan. 23, 2012

(87) PCT Pub. No.: WO2011/043199
PCT Pub. Date: Apr. 14, 2011

(65) Prior Publication Data
US 2012/0125761 A1 May 24, 2012

(30) Foreign Application Priority Data

Oct. 5, 2009 (JP) .................................. 2009-231490

(51) Int. Cl.
*B01D 1/28* (2006.01)
*B01D 3/26* (2006.01)

(52) U.S. Cl.
USPC ........ 202/154; 62/238.6; 159/24.1; 159/43.1; 202/158; 202/172; 202/182; 202/262; 203/26; 203/71; 203/98; 261/114.1

(58) Field of Classification Search . 62/238.6; 159/24.1, 159/43.1; 202/154, 155, 158, 172, 182, 262; 203/26, 203/71, 98, DIG. 8; 261/114.1, 114.4, 114.5, 261/DIG. 72
See application file for complete search history.

(56) References Cited

U.S. PATENT DOCUMENTS

| 3,575,007 A | * | 4/1971 | Gunther | 62/620 |
| 4,234,391 A | * | 11/1980 | Seader | 203/26 |
| 4,277,268 A | * | 7/1981 | Spangler, Jr. | 62/630 |
| 4,737,177 A | * | 4/1988 | Erickson | 62/646 |

(Continued)

FOREIGN PATENT DOCUMENTS

| EP | 1800726 A1 | 6/2007 |
| JP | 04-250801 A | 7/1992 |

(Continued)

*Primary Examiner* — Virginia Manoharan
(74) *Attorney, Agent, or Firm* — Knobbe Martens Olson & Bear LLP

(57) ABSTRACT

Provided is a heat integrated distillation apparatus includes: rectifying column including a trayed section or a packed bed section; stripping column including a trayed section or a packed bed section located higher than rectifying column; first pipe for connecting top part of the stripping column with bottom part of the rectifying column; and compressor that compresses vapor from top part of the stripping column to feed the compressed vapor to bottom part of the rectifying column. The heat integrated distillation apparatus further includes: heat exchanger located either at the trayed section or a packed bed section of rectifying column or at the trayed section or a packed bed section of stripping column; second pipe; and third pipe for circulating fluids through the heat exchanger.

7 Claims, 6 Drawing Sheets

U.S. PATENT DOCUMENTS

| | | | | |
|---|---|---|---|---|
| 4,961,826 A | * | 10/1990 | Grethlein et al. | 203/19 |
| 5,351,492 A | * | 10/1994 | Agrawal et al. | 62/648 |
| 5,435,436 A | * | 7/1995 | Manley et al. | 203/74 |
| 5,737,940 A | * | 4/1998 | Yao et al. | 62/620 |
| 6,045,660 A | * | 4/2000 | Savage et al. | 202/172 |
| 6,348,137 B1 | * | 2/2002 | Nommensen | 203/49 |
| 6,605,190 B1 | * | 8/2003 | Salamon et al. | 203/1 |
| 7,824,542 B2 | * | 11/2010 | Menzel | 208/341 |
| 8,002,952 B2 | * | 8/2011 | Sechrist | 202/153 |
| 2002/0183566 A1 | * | 12/2002 | Guth et al. | 568/902 |

FOREIGN PATENT DOCUMENTS

| | | |
|---|---|---|
| JP | 2004-016928 A | 1/2004 |
| WO | 2004/002602 A1 | 8/2004 |
| WO | 2006/022208 A1 | 2/2006 |

* cited by examiner

Prior Art

Prior Art

HEAT INTEGRATED DISTILLATION APPARATUS

CROSS-REFERENCE TO RELATED APPLICATIONS

This application is the U.S. National Phase under 35. U.S.C. §371 of International Application PCT/JP2010/066498, filed Sep. 24, 2010, which claims priority to Japanese Patent Application No. 2009-231490, filed Oct. 5, 2009. The International Application was published under PCT Article 21(2) in a language other than English.

TECHNICAL FIELD

The present invention relates to a distillation apparatus that carries out a distillation operation widely applied to many industrial processes, and more particularly to a heat integrated distillation apparatus.

BACKGROUND ART

Distillation separation is an unit operation widely applied to industrial processes in general, but consumes a large amount of energy. In the industrial field, therefore, studies have been conducted on an energy saving distillation systems. Such studies have brought about development of a heat integrated distillation column (hereinafter, HIDiC) as a distillation apparatus that save much energy.

As shown in FIG. 1, a basic system of the HIDiC has a structure where a rectifying section (high-pressure unit) and a stripping section (low-pressure unit) are provided such that they are separate from each other. Operation pressure of the rectifying section is set higher than that of the stripping section so that the operation temperature of the rectifying section can be higher than that of the stripping section. This enables a reduction in the amount of heat that is supplied to a reboiler because heat transfer occurs from the rectifying section to the stripping section when there is a heat-exchange surface therebetween. Heat of the rectifying section moves to the stripping section, and hence the amount of heat that is removed at a condenser can be reduced. As a result, high energy saving distillation apparatus can be achieved.

In order to put the concept of HIDiC to practical use, a distillation apparatus having a double-pipe structure as discussed in JP2004-16928A has been proposed (hereinafter, Patent Literature 1).

As shown in FIG. 2, this distillation apparatus, which includes a shell 51 and a plurality of tube units 52 installed in the shell 51, is formed by connecting each tube unit 52 to the shell 51 via upper tube sheet 53a and lower tube sheet 53b.

Each tube unit 52 has a double-pipe structure. Inner pipe 54 of tube unit 52 is used as a rectifying section while outer pipe 55 surrounding an outer surface of inner pipe 54 is used as a stripping section. Packing (structured packing) 54a and 55a are placed along the inside of inner pipe 54, and between the outer pipe 55 and the inner pipe 54. Refer to FIG. 3 for tube unit 52. The plurality of tube units 52 are arranged so that outer walls 65 of outer pipes 55 can come into contact with each other.

Referring again to FIG. 2, liquid inlet of stripping section 56 to supply liquid feed to the outer pipe (stripping section) 55 and vapor outlet of stripping section 57 to discharge vapor from the outer pipe 55 are arranged in an upper part of the shell 51.

Above upper tube sheet 53a, channel 58a that communicates only with inner pipe (rectifying section) 54 is formed.

An upper end of the outer pipe 55 is not connected to upper tube sheet 53a that is to be opened.

Liquid inlet of rectifying section 59 to supply liquid (reflux) to the inner pipe 54 and vapor outlet of rectifying section 60 to discharge vapor from the inner pipe 54 are arranged in upper channel 58a.

Vapor inlet of stripping section 61 to supply vapor to the outer pipe 55 and liquid outlet of stripping section 62 to discharge liquid from the outer pipe 55 are arranged in a lower part of the shell 51.

Below lower tube sheet 53b, channel 58b that communicates with inner pipe 54 is formed. A lower end of outer pipe 55 is not connected to lower tube sheet 53b that is to be opened.

Vapor inlet of rectifying section 63 to supply vapor to the inner pipe 54 and liquid outlet of rectifying section 64 to discharge liquid from the inner pipe 54 are arranged in lower channel 58b.

In the abovementioned distillation apparatus, liquid feed are supplied through liquid inlet of stripping section 56, and uniformly distributed to upper of outer pipes 55 of tube units 52. Among liquid feed supplied to the upper end of outer pipes 55, liquid descending from outer pipe 55 in being fractionated in the outer pipe 55, is supplied to the reboiler installed outside of column via liquid outlet of stripping section 62 and is reboiled. Vapor generated by the reboiler enters the column again from vapor inlet of stripping section 61. The vapor from vapor inlet of stripping section 61 is distributed to a lower surface of outer pipe 55 of each tube unit 52 and ascends in each outer pipe 55. The liquid that is left without being vaporized is discharged as a product of the column bottom.

The vapor ascending from the outer pipe 55 in being fractionated, flows to a compressor via vapor outlet of stripping section 57. The vapor passing through the compressor enters a rectifying section via vapor inlet of rectifying section 63. The vapor from vapor inlet of rectifying section 63 ascends from the lower surface of each inner pipe 54. The vapor ascending through inner pipe 54 in being fractionated exits from an upper surface of each inner pipe 54, and is supplied to the condenser outside of column via vapor outlet of rectifying section 60. The vapor from the rectifying section is totally or partially condensed by the condenser. When necessary, a part of the condensed liquid is supplied as reflux to inner pipe 54 via rectifying section liquid entrance 59, while the rest is discharged as a distillate product.

In this configuration, energy transfer occurs from the rectifying section (inner pipe 54) to the stripping section (outer pipe 55). Hence, an amount of heat that is supplied at the reboiler and an amount of heat that is removed at the condenser can be reduced, and energy efficiency can be very high.

However, the heat integrated distillation apparatus having the rectifying section and the stripping section formed into the double-pipe structures as discussed in Patent Literature 1 has the following problems 1) to 6).

1) The product cannot be obtained with side-cut stream. The side-cutting means that a product is withdrawn as an intermediate distillate product, during a distillation process until an end distillate is acquired from top of column.

In the distillation apparatus described in Patent Literature 1, the tube units of the double-pipe structures are arranged to come into contact with each other. Moreover, the outer pipes and the inner pipes are equipped with the structured packing As a result, no pipe arrangement can be formed to withdraw any intermediate distillate product from the inner pipe of each tube unit. Consequently, the structure disables side-cutting.

2) The feed stage where feed stream is provided cannot be optimized. This is because in the rectifying section and the stripping section formed into the double-pipe structures, packing heights thereof are equal, disabling free setting of the number of stages of the rectifying section and the stripping section.

3) The feed stage cannot be changed so as to meet the feed stream composition. This is because of the structure where free setting of the feeding stage position is disabled as described in 2).

4) Multi-feed stream (reception of a plurality of feed streams) cannot be dealt with. This is because of the structure where no feed stream can be supplied in the midway of the double-pipes as described in 1).

5) Maintenance of the apparatus is difficult. The tube units that use the structured packing are densely arranged to be adjacent to each other as described in 1). This disables complete access to the desired tube unit, and maintenance thereof cannot be carried out.

6) The heat exchanged rate between the rectifying section and the stripping section that uses double-pipes and in which there is no a degree of freedom in design for designing the heat transfer area, depends only on the temperature profile of the distillation column. Hence, in apparatus design, a degree of freedom in design of heat exchanged rate is small.

Q, the heat exchanged rate between the rectifying section and the stripping section, is represented by $Q=U \times A \times \Delta T$, where U is an overall heat-transfer coefficient, A is a heat transfer area, and $\Delta T$ is a temperature difference between the rectifying section and the stripping section. In the HIDiC using the double-pipe structure, an inner pipe wall surface becomes a heat transfer area. This heat transfer area has a fixed value determined by a structure of the double-pipes. The overall heat-transfer coefficient also has a fixed value determined by the heat transfer structure and fluid physical properties involved in heat exchange. Thus, as can be understood from the heat exchanged rate formula, a heat exchanged rate on design specification can be changed based only on the temperature difference between the rectifying section and the stripping section, which is changed by the operating pressure of the rectifying section and the stripping section.

SUMMARY OF INVENTION

The present invention provides the following heat integrated distillation apparatus to solve the above-mentioned problems.

According to an aspect of the present invention, a heat integrated distillation apparatus includes: a rectifying column including a trayed section or a packed bed section, which is a column shell used as a rectifying section; a stripping column located higher than the rectifying column and including a trayed section or a packed bed section used as a stripping section; a first pipe for communicating a column top of the stripping column with a column bottom of the rectifying column; and a compressor installed midway in the first pipe and configured to compress vapor from the top of the stripping column and then to feed the compressed vapor to the bottom of the rectifying column.

The heat integrated distillation apparatus according to an aspect of the present invention further includes:
a heat exchanger located at a predetermined stage of the rectifying column;
a liquid withdrawal unit located at a predetermined stage of the stripping column and configured to withdraw a part of liquid from the predetermined stage to the outside of the column;
a second pipe for introducing the liquid from the liquid withdrawal unit to the heat exchanger; and
a third pipe for introducing fluids introduced through the second pipe to the heat exchanger and then discharged out of the heat exchanger to a stage directly below the liquid withdrawal unit.

In the heat integrated distillation apparatus according to the aspect of the present invention, the fluids flow from the stripping column to the heat exchanger of the rectifying column through the second pipe. Heat is removed from the vapor of the rectifying column in the heat exchanger. Then, the heat can be transferred from the rectifying column to the stripping column through the third pipe. The fluids flow from the stripping column to the rectifying column by gravity. The fluids in the heat exchanger are accordingly pushed to flow from the rectifying column to the stripping column. In other words, this heat integrated distillation apparatus employs a thermosiphon system, and hence no pressure-feeding means such as a pump is necessary for supplying the liquid from the rectifying column to the stripping column located above in a vertical direction.

According to another aspect of the present invention, a heat integrated distillation apparatus includes:
a liquid sump unit located at a predetermined stage of the stripping section and configured to hold descending liquid;
a heat exchanger located in the liquid sump unit of the stripping column;
a partition plate set in a predetermined position of the rectifying column and configured to apart upper stages and lower stages completely;
a second pipe for introducing vapor below the partition plate to the heat exchanger; and
a third pipe for introducing fluids introduced through the second pipe to the heat exchanger and then discharged out of the heat exchanger to an upper side of the partition plate.

According to the alternative example, the vapor is withdrawn from the rectifying column through the second pipe. The vapor is introduced to the heat exchanger in the stripping column. Then, heat can be transferred from the rectifying column to the stripping column. High-pressure vapor in the rectifying column ascends through the second pipe to the heat exchanger in the stripping column. Liquid condensed from the vapor in the heat exchanger is accordingly pushed out from the stripping column to the third pipe outside the column, and flows to the rectifying column by gravity. Thus, this configuration also necessitates no pressure-feeding means such as a pump.

With the apparatus configuration according to the first aspect or the second aspect, which transfers heat from the rectifying column to the stripping column by using the second and third pipes, as compared with a distillation apparatus including no such heat transfer configuration, the heat exchanged rate removed from a condenser attached to a top of the rectifying section can be reduced more, and the heat exchanged rate that is supplied to a reboiler attached to the bottom of the stripping column can be reduced more. As a result, a distillation apparatus that is very high in energy efficiency can be provided.

The rectifying column and the stripping column are configured by using trayed sections or packed bed sections similar to those of a general distillation apparatus. Hence, the apparatus can deal with side cutting or multi-feed stream without the need for any improvement, and it is possible to easily perform maintenance of the apparatus. For the same reason, the number of stages of the rectifying column or the stripping column can be freely set, and a feed stage can be optimized.

A heat transfer area can be freely set, and hence the heat exchanged rate can be determined without any dependence on the temperature difference between the columns.

As described above, according to the present invention, energy efficiency is high, side-cutting and setting of a feed stage position can be easily dealt with, and maintenance of the apparatus is easy.

The apparatus of the present invention has a structure where a degree of freedom in design is high, and hence can be easily accepted by the user side.

DESCRIPTION OF EMBODIMENTS

A general distillation apparatus, which is not an internally heat integrated distillation apparatus, includes a column built in a vertical direction and having a bottom section, a trayed section (or packed bed section), and a top section. At a boundary of feed location, an upper side of the trayed section (or packed bed section) is a rectifying section and a lower side is a stripping section. On the other hand, a heat integrated distillation apparatus according to the present invention has a basic feature in which a stripping section and a rectifying section similar to those described above are separated from each other, a column shell (stripping column) that is use as is the stripping section extending in a vertical direction and a column shell (rectifying column) that is use as the rectifying section extending in the vertical direction are provided, and the stripping column is located higher than the rectifying column. Hereinafter, embodiments of the present invention are described with reference to the drawings.

First Embodiment

Figure 1:
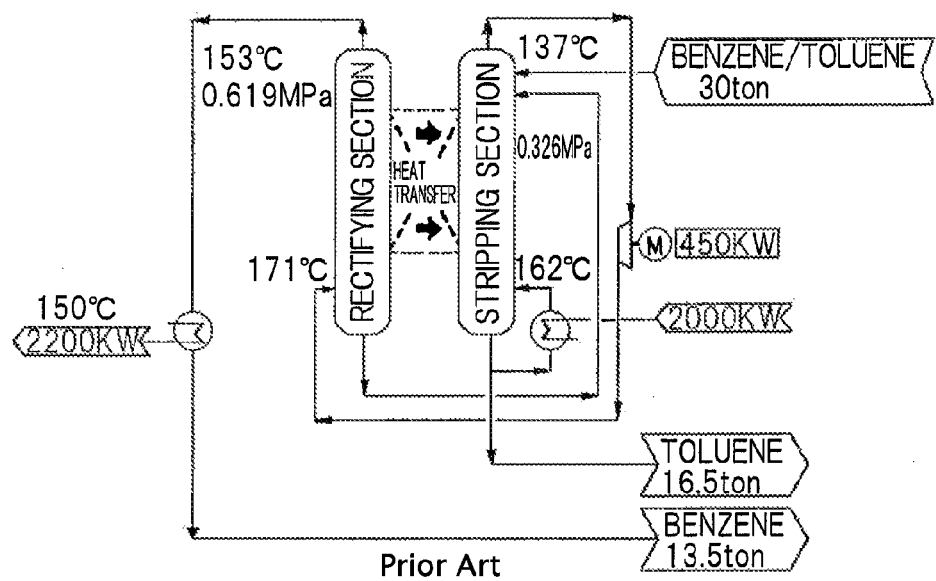
FIG. 1 shows a basic structure of a HIDiC.
Figure 2:
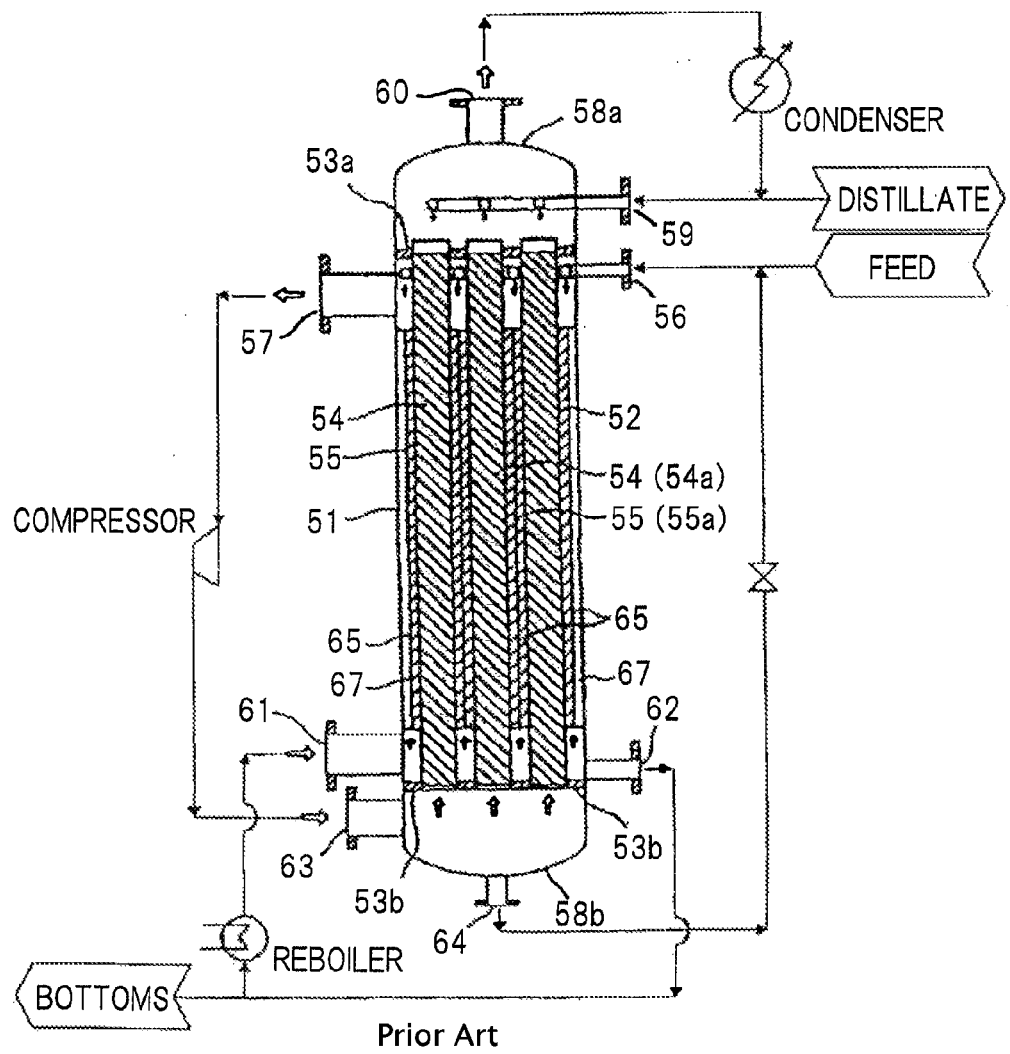
FIG. 2 shows a heat integrated distillation column using a double-pipe structure described in Patent Literature 1.
Figure 3:
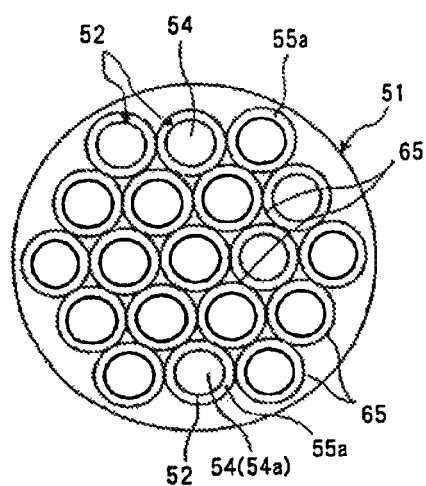
FIG. 3 is a horizontal sectional view showing the double-pipe structure in the distillation column shown in FIG. 2.
Figure 4:
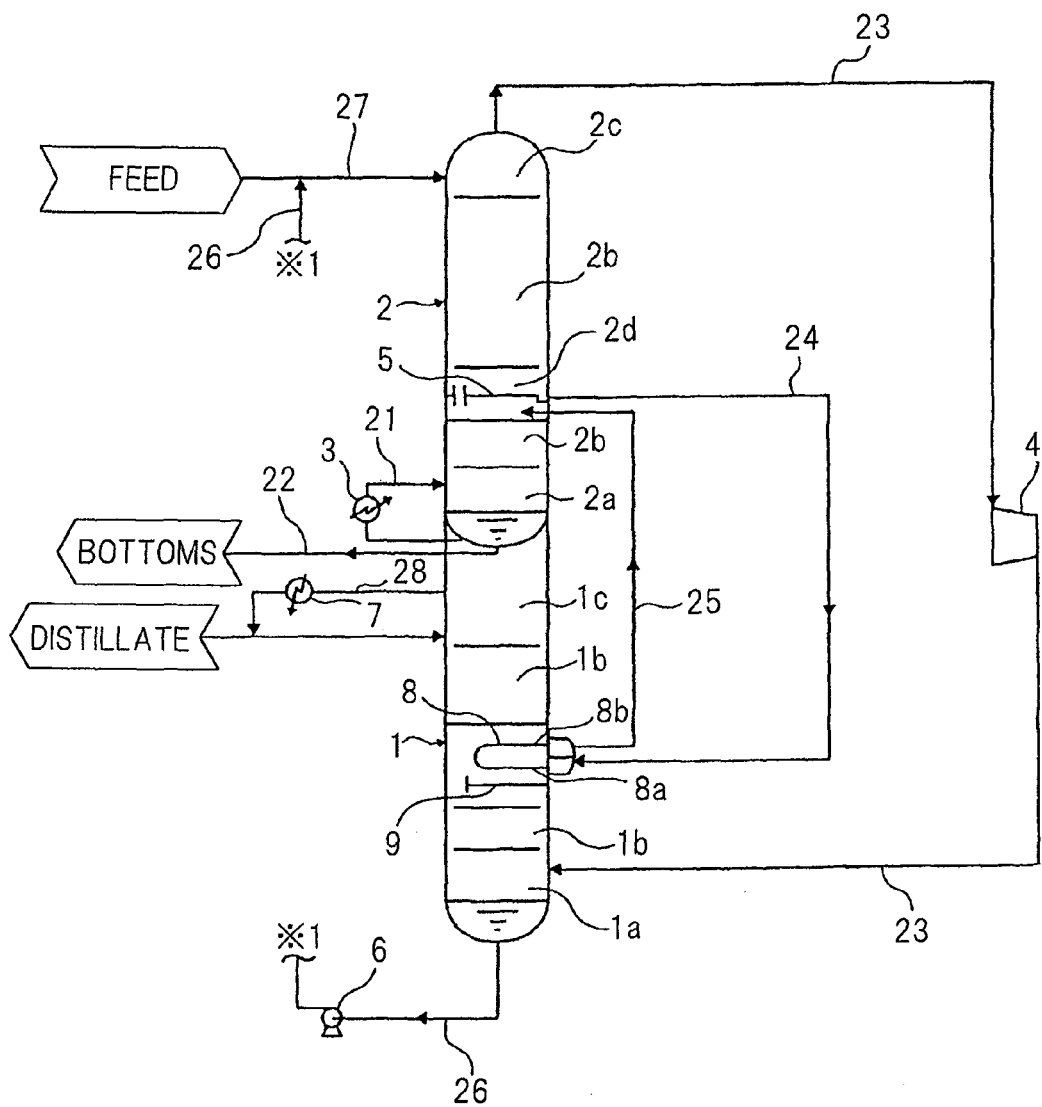
FIG. 4 shows an overall configuration of a heat integrated distillation apparatus according to a first embodiment of the present invention.

FIG. 4 shows an overall configuration of a heat integrated distillation apparatus according to a first embodiment. The heat integrated distillation apparatus according to the embodiment includes rectifying column 1 and stripping column 2 that are located higher than rectifying column 1. Rectifying column 1 includes column bottom 1a, trayed section (or packed bed section) 1b, and top column 1c. Stripping column 2 also includes column bottom 2a, trayed section (or packed bed section) 2b, and top column 2c.

Trayed section 1b and 2b are sections where several horizontal trays are located therein. A tray on which vapor and liquid contact mutually is referred to as a stage. At each stage, gas-liquid contact promotes a mass transfer. As a result, a gas phase having rich in components with higher volatility ascends to an upper stage, while a liquid phase having rich in components with lower volatility descends to a lower stage. Then, gas-liquid contact is executed again with a new liquid phase or gas phase there for further mass transfer. Thus, there are components in rich with higher volatility at a higher stage of the column, there are components in rich with lower volatility at a lower stage, and a distillation operation is accomplished.

The packed section that can replace the trayed section is a section where a certain packing is installed in the empty column, and gas-liquid contact is executed on its surface. By the same mechanism as that of the trayed column, there are components in rich with higher volatility at a higher part, there are components in rich with lower volatility at a lower part, and a distillation operation is accomplished.

In FIG. 4, trayed sections 1b and 2b (or packed bed sections) are shown as blank. In reality, however, the abovementioned structures are employed.

Each of rectifying column 1 and stripping column 2 is described in detail. First, stripping column 2 is described.

Heater 3 referred to as a reboiler is disposed outside column bottom 2a of stripping column 2, and pipe 21 is provided from a lower space part of column bottom 2a through heater 3 to an upper space part of column bottom 2a. Liquid descending through trayed section 2b (or packed bed section) of stripping column 2 accordingly stays at column bottom 2a. A part of the liquid is heated by heater 3 to become vapor, and returns to column bottom 2a. From the bottommost part of column bottom 2a, liquid in rich with lower volatility components is acquired through pipe 22.

Column top 2c of stripping column 2 is a position for supplying feed stream. Column top 2c is connected, via compressor 4, to column bottom 1a of rectifying column 1 by using pipe 23. According to an embodiment, the feed stream is supplied at the top of column 2c of stripping column 2. However, the feed stage can be an arbitrary stage of trayed section 2b (or packed bed section). Even when there is a plurality of raw materials, the feed stage can be column top 2c of stripping column 2 and other arbitrary stages (including a stage of rectifying column 1).

Figure 5:
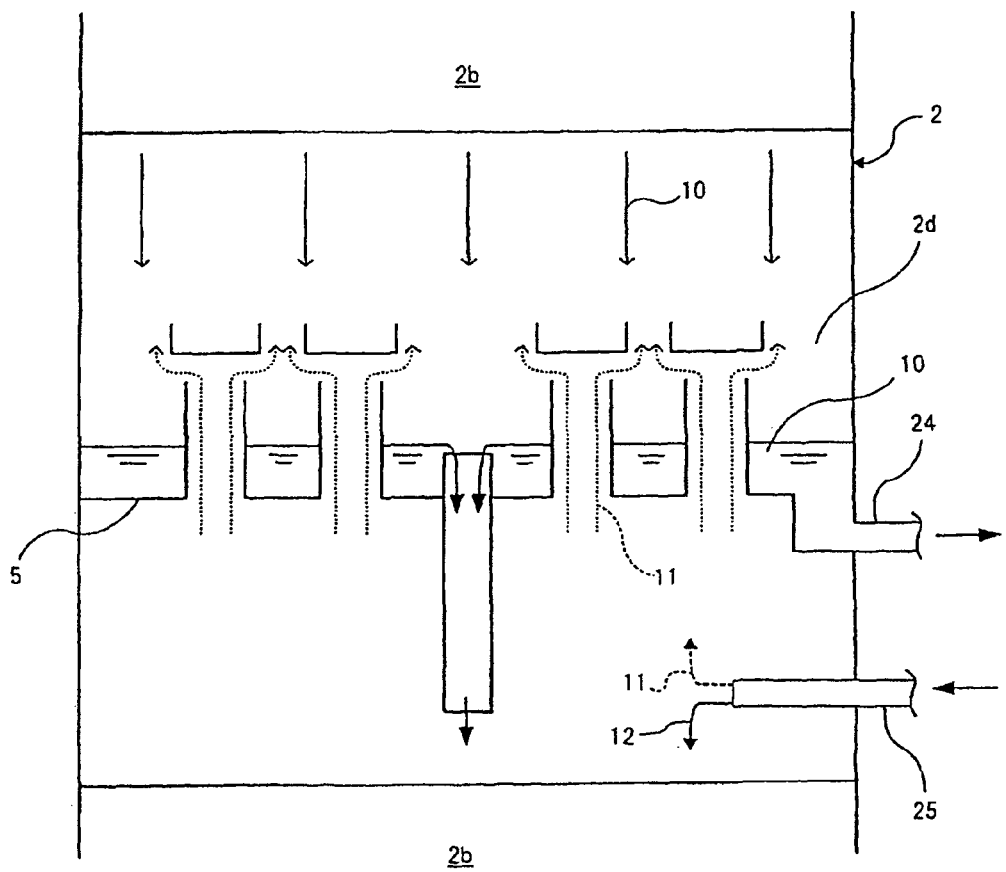
FIG. 5 shows a configuration of a liquid withdrawal unit shown in FIG. 4.

In addition, trayed section 2b (or packed bed section) of stripping column 2 includes liquid withdrawal unit 2d at a predetermined stage. As shown in FIG. 5, liquid withdrawal unit 2d holds liquid 10 descending from an upper part of stripping column 2 at chimney tray for sump 5, and withdraws a part of liquid 10 from stripping column 2. Pipe 24 for directing a part of liquid 10 to rectifying column 1 is connected to liquid withdrawal unit 2d. Pipe 25 from rectifying column 1 is inserted through a shell wall of stripping column 2 into a stage directly below liquid withdrawal unit 2d. From pipe 25 inserted into the stage directly below liquid withdrawal unit 2d, fluids having a mixture of vapor 11 and liquid 12 are introduced as described below, and vapor 11 ascends while liquid 12 descends.

Rectifying column 1 is described.

One end of pipe 26 is connected to a bottommost part of column bottom 1a of rectifying column 1, while the other end of pipe 26 is connected to pipe 27 for supplying feed materials to column top 2c of stripping column 2. To recycle the liquid staying at column bottom 1a of rectifying column 1 to column top 2c of stripping column 2 located higher than rectifying column 1, pump 6 is necessary at the midway section of pipe 26.

Condenser 7 is equipped outside column top 1c of rectifying column 1, and pipe 28 is connected from an upper space part of column top 1c to condenser 7. Thus, vapor that has withdrawn from column top 1c of rectifying column 1 is cooled by the condenser 7 to become liquid, and a distillate liquid having components with higher volatility is acquired. A part of the liquid is refluxed to column top 1c.

In addition, tube-bundle-type heat exchanger 8 is inserted into a predetermined stage of trayed section 1b (or packed bed section) of rectifying column 1. A parallel tube portion in a U-shaped tube of tube-bundle-type heat exchanger 8 is equipped along chimney tray for sump 9 for temporarily holding a condensed liquid and re-distributing vapor ascending from below. Lower tube portion 8a of the parallel tube portion is connected to pipe 24 connected to liquid withdrawal unit 2d of stripping column 2. Upper tube portion 8b is connected to pipe 25 that is inserted into the stage directly below liquid withdrawal unit 2d.

An operation of tube-bundle-type heat exchanger 8 is described.

Figure 6:
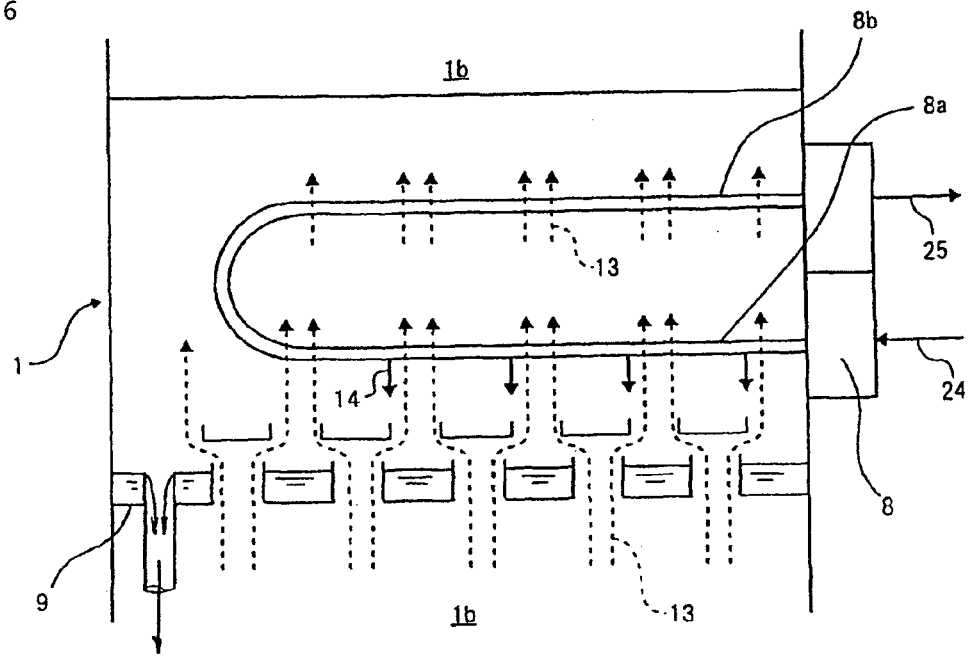
FIG. 6 shows a peripheral configuration of a tube-bundle-type heat exchanger located in a rectifying column shown in FIG. 4.

In the apparatus, the pressure and temperature of vapor out of column 2c of stripping column 2, that is to be supplied to column bottom 1a of rectifying column 1, is increased by compressor 4. Vapor 13 (refer to FIG. 6), whose temperature increased, is introduced to column bottom 1a of rectifying section 1 where it ascends and comes into contact with the U-shaped tube of tube-bundle-type heat exchanger 8. In this case, liquid at an arbitrary stage of stripping column 2 is introduced through pipe 24 to lower tube portion 8a of heat exchanger 8. Thus, the liquid in tube portion 8a is heated by the heat of vapor 13, and a part of vapor 13 in contact with tube portion 8a is condensed and becomes liquid 14 which descends. Upper tube portion 8b of heat exchanger 8 is also heated by the heat of vapor 13. Thus, the liquid introduced through pipe 24 into heat exchanger 8 changes into fluids having a mixture of a liquid phase and a gas phase while moving from lower tube portion 8a to upper tube portion 8b. The fluids then pass through pipe 25 outside the column to be introduced to the stage directly below liquid withdrawal unit 2d of stripping section 2 (refer to FIG. 4). For circulating of such fluids, no pressure-feeding means such as a pump is necessary because the configuration employs the thermosiphon system.

In other words, because liquid withdrawal unit 2d of stripping column 2 is connected to lower tube portion 8a of heat exchanger 8 of rectifying column 1 via pipe 24 and because upper tube portion 8b of heat exchanger 8 of rectifying column 1 is connected to the stage directly below liquid withdrawal unit 2d of stripping column 2 via pipe 25, the liquid descends from stripping column 2 to rectifying column 1 by gravity. As a result, gravity causes the fluids to flow from rectifying column 1 to stripping column 2 even when there is no pump.

As described above, according to the embodiment, the heat can be removed from the vapor in rectifying column 1 by heat exchanger 8, and transferred from rectifying column 1 to stripping column 2 through pipe 25. A heat transfer system using pipes 24 and 25 and heat exchanger 8, as in the case of the embodiment, is configured as if a side condenser is installed at an arbitrary stage of rectifying column 1 and, simultaneously, as if a side reboiler is installed at an arbitrary stage of stripping column 2. Thus, as compared with a distillation apparatus that includes no such heat transfer system, the amount of heat that has been removed can be reduced at condenser 7 of rectifying column 1, and the amount of heat that has been supplied can be reduced at reboiler 3 of stripping column 2. As a result, a high energy saving distillation apparatus can be achieved.

FIG. 4 shows only one heat transfer system. However, the number of heat transfer systems equivalent to 10 to 30% of the total number of theoretical stages can be installed. Needless to say, the number of heat transfer systems to be installed and locations of the heat exchanger and the pipes can be arbitrarily determined according to a design specification.

Second Embodiment

Next, a second embodiment of the present invention is described. Components similar to those of the first embodiments are described by using similar reference numerals.

Figure 7:
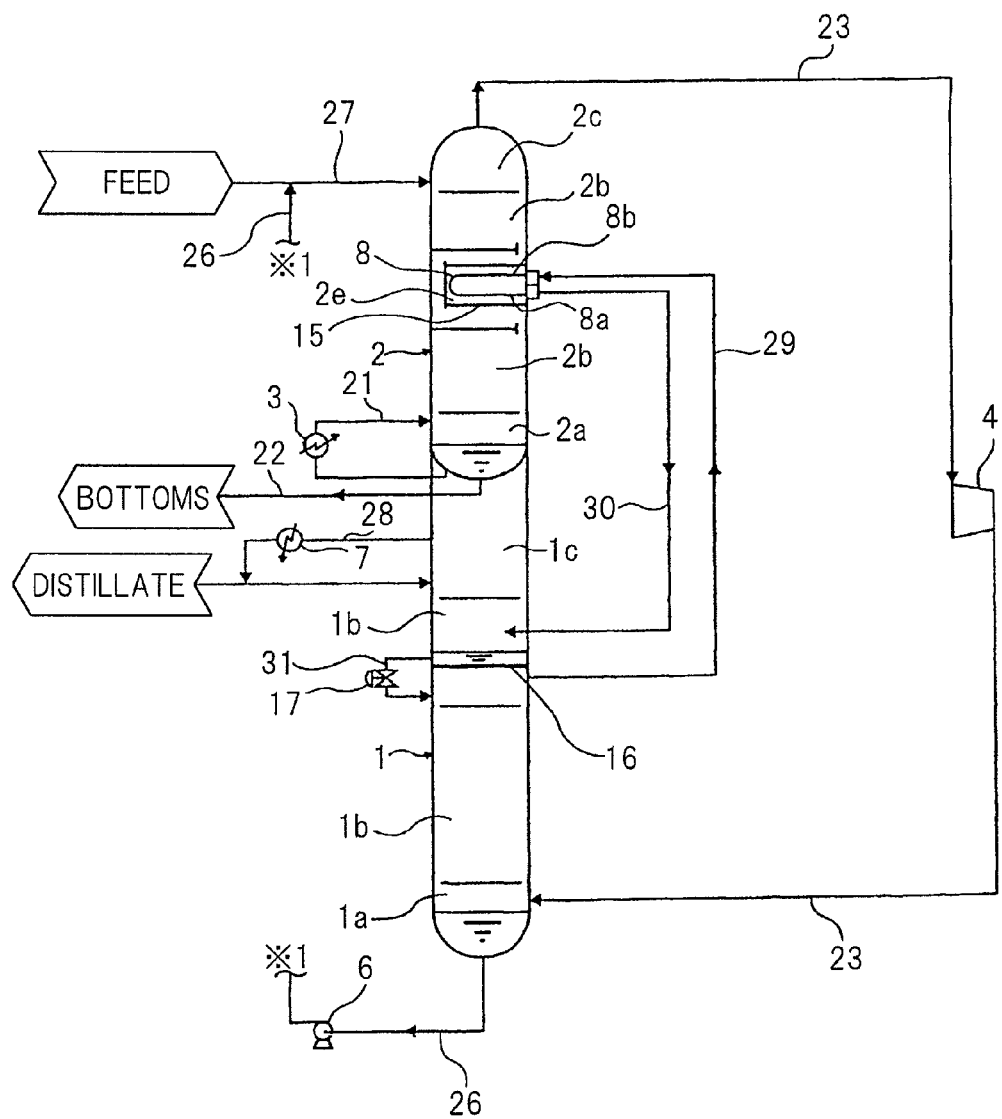
FIG. 7 shows an overall configuration of a heat integrated distillation apparatus according to a second embodiment of the present invention.

FIG. 7 shows an overall configuration of a heat integrated distillation apparatus according to the second embodiment. The heat integrated distillation apparatus according to the embodiment includes rectifying column 1 and stripping column 2 located higher than rectifying column 1. Rectifying column 1 includes column bottom 1a, trayed section (or packed bed section) 1b, and top column 1c. Stripping column 2 also includes column bottom 2a, trayed section (or packed bed section) 2b, and top column 2c. A specific configuration of the trayed column or the packed column is similar to that of the first embodiment.

The embodiment is different from the first embodiment in that tube-bundle-type heat exchanger 8 is located on stripping column 2 side.

For stripping column 2 according to the embodiment, components (reboiler 3, and pipes 21, 22, 23, and 27) belonging to column bottom 2a and column top 2c are similar to those of the first embodiment as shown in FIG. 7. However, components for trayed section 2b (or packed bed section) are changed from those of the first embodiment.

Figure 8:
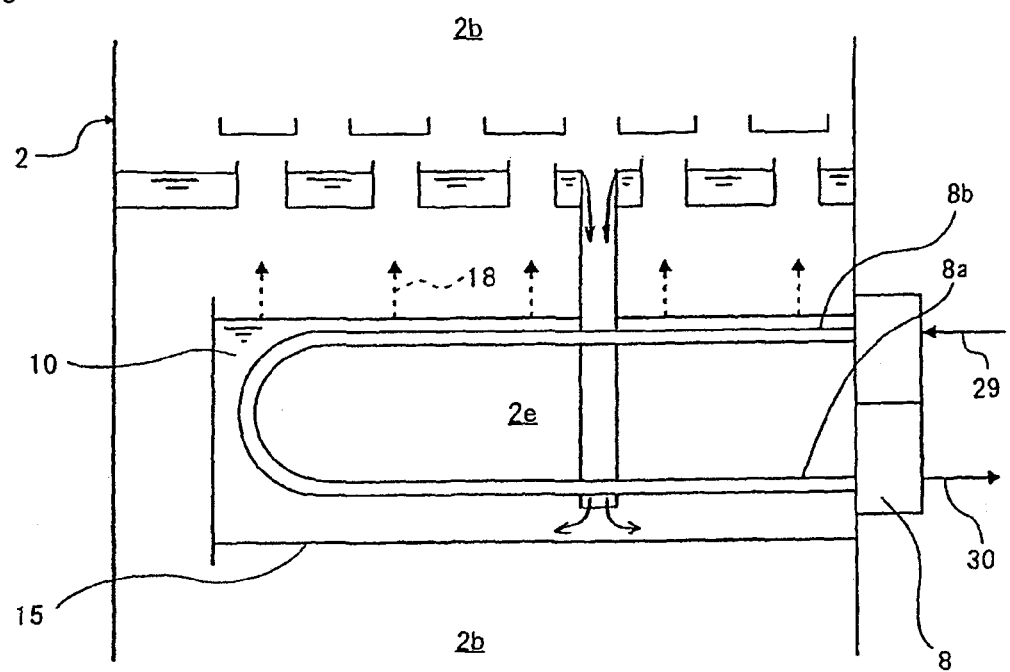
FIG. 8 shows a peripheral configuration of a tube-bundle-type heat exchanger located in a stripping column shown in FIG. 7.

Trayed section 2b (or packed bed section) includes liquid sump unit 2e at a predetermined stage. Liquid sump unit 2e stores a predetermined amount of liquid 10 that has flowed down onto chimney tray for sump 15, and liquid spilled from chimney tray for sump 15 drops. To dip a U-shaped tube of tube-bundle-type heat exchanger 8 in the liquid stored by liquid sump unit 2e, tube-bundle-type heat exchanger 8 is inserted into liquid sump unit 2e (refer to FIG. 8). Parallel tube portions 8a and 8b in the U-shaped tube of tube-bundle-type heat exchanger 8 are arranged along chimney tray for sump 15.

Pipe 29 (refer to FIG. 7) for feeding fluids from rectifying column 1 to stripping column 2 is connected to upper tube portion 8b of the parallel tube portions. Pipe 30 (refer to FIG. 7) for feeding fluids from stripping column 2 to rectifying column 1 is connected to lower tube portion 8a.

An operation of heat exchanger 8 at liquid sump unit 2e is described.

In the apparatus, a liquid feed descends from column top 2c of stripping column 2 through a trayed or a packed layer. Liquid 10 (refer to FIG. 8) stays at liquid sump unit 2e on chimney tray for sump 15 that is located at an arbitrary stage. The U-shaped tube of tube-bundle-type heat exchanger 8 is located in liquid sump unit 2e, and hence the U-shaped tube is dipped in liquid 10. In this state, when high-temperature vapor in rectifying column 1 is introduced through pipe 29 into upper tube portion 8b of heat exchanger 8, a part of liquid 10 in contact with the outer walls of tube portions 8a and 8b, where the high-temperature vapor moves, is heated to become vapor 18, and ascends (refer to FIG. 8). The high-temperature vapor introduced through pipe 29 into heat exchanger 8 changes to fluids that have a mixture of a liquid phase and a gas phase while being moved from upper tube portion 8b to lower tube portion 8a. The fluids are introduced through pipe 30 outside the column to a stage on partition plate 16 of rectifying column 1 described below (refer to FIG. 7). Operation pressure is set lower on partition plate 16 than that below partition plate 16. This pressure difference causes circulation of the fluids. In such circulation of the fluids, the configuration needs no special pressure-feeding means such as a pump, as in the case of the first embodiment.

In other words, because a predetermined stage of rectifying column 1 is connected to upper tube portion 8b of heat exchanger 8 in stripping column 2 via pipe 29 and because lower tube portion 8a of heat exchanger 8 in stripping column 2 is connected to the predetermined stage of rectifying column 1 via pipe 30, due to the pressure difference between the upper and lower of partition plate 16, the high-pressure vapor in rectifying column 1 ascends through pipe 29 toward heat exchanger 8 in stripping column 2. Liquid that is condensed from vapor in heat exchanger 8 is then pushed out from stripping column 2 to pipe 30 that is outside the column, and descends to rectifying column 1 by gravity. Thus, no pressure-feeding means such as a pump is necessary.

Rectifying column 1 according to the embodiment is described.

Similarly, for rectifying column 1, components (condenser 7, and pipes 23, 26, and 28) belonging to column bottom 1a and column top 1c are similar to those of the first embodiment as shown in FIG. 7. However, components for trayed section 1b (or packed bed section) are changed from those of the first embodiment. Specifically, the middle section of trayed section 1b (or packed bed section) of rectifying column 1 is completely partitioned into upper and lower stages by partition plate 16. The stage directly below partition plate 16 communicates with pipe 29. Ascending vapor at this stage is fed, through pipe 29 extending in a vertical direction, to upper tube portion 8b of heat exchanger 8 located in liquid sump unit 2e of stripping column 2.

Pipe 30 from stripping column 2 side is inserted through an outer wall of rectifying column 1 into the upper stage of partition plate 16. Fluids having a mixture of vapor and liquid are introduced through pipe 30 to the upper stage of partition plate 16. The vapor ascends while the liquid descends to stay on partition plate 16. The ascending vapor that has moved to column top 1c passes through pipe 28 to be cooled by condenser 7. As a result, a distillate liquid having rich in high volatility components is acquired.

The two upper and lower stages sandwiching partition plate 16 can be connected to each other via pipe 31 having control valve 17. The liquid held on partition plate 16 is fed to the lower stage of partition plate 16 by an opening operation of control valve 17 when appropriate.

As described above, according to the embodiment, by removing the vapor from rectifying column 1 through pipe 29, and introducing the vapor into heat exchanger 8 in stripping column 2, heat can be removed from rectifying column 1 to transfer into stripping column 2. A heat transfer system using pipes 29 and 30 and heat exchanger 8, as in the case of the embodiment, is configured as if a side condenser is installed at an arbitrary stage of rectifying column 1 and, simultaneously, a side reboiler is installed at an arbitrary stage of stripping column 2. Thus, as compared with a distillation apparatus that includes no such heat transfer system, the amount of heat that has been removed can be reduced at condenser 7 of rectifying column 1, and the amount of heat that has been input can be reduced at reboiler 3 of stripping column 2. As a result, a very high energy saving distillation apparatus can be achieved.

FIG. 7 shows only one heat transfer system. However, according to the embodiment, as in the case of the first embodiment, the number of heat transfer systems to be installed and the locations of the heat exchanger and the pipes can be arbitrarily determined according to a design specification.

The heat integrated distillation apparatus according to each of the first and second embodiments is configured by using the trayed column or the packed column similar to that of the general distillation apparatus. This enables side-cutting or multi-feeding without any need to improve the apparatus, and easy maintenance of the apparatus. For the same reason, freedom for setting the numbers of stages for the rectifying column and the stripping column enables optimization of feed stages. In other words, the present invention can solve problems 1) to 5) of the heat integrated distillation apparatus using the double-pipe structure represented by Patent Literature 1.

According to the embodiment of the present invention, tube-bundle-type heat exchanger 8 is used as the component of the heat transfer system that transfers heat from rectifying column 1 to stripping column 2. This enables free changing of the heat transfer area A based on a tube design of heat exchanger 8. Thus, in order to determine the amount of heat that is to be exchanged between rectifying column 1 and stripping column 2, not only the temperature difference ΔT between rectifying column 1 and stripping column 2 but also the heat transfer area A can be freely set. The present invention can therefore solve problem 6) of the heat integrated distillation apparatus using the double-pipe structure.

The preferred embodiments of the present invention have been described. However, the embodiments are in no way limitative of the present invention. Needless to say, various changes can be made to the present invention within its technical teachings.

According to the first and second embodiments, the distillation column includes the heat exchanger. However, the present invention is not limited to this arrangement. The present invention allows the heat exchanger to be installed outside the distillation column as long as heat can be transferred between the fluids of the portion including the stripping column and the fluids of the portion including the rectifying column. For the shape of the heat exchanger, each of the embodiments employs a tube-bundle-type heat exchanger of the U-shape tube only as a general example when the heat exchanger is included in the distillation column. Heat exchangers of other shapes can be used.

According to each of the embodiments, rectifying column 1 and stripping column 2 are connected to each other in the vertical direction. However, the present invention is not limited to this arrangement. In other words, the present invention includes an arrangement where rectifying column 1 and stripping column 2 are configured separately and independently, and stripping column 2 is located higher than rectifying column 1.

EXPLANATION OF REFERENCE NUMERALS 1 rectifying column
1a column bottom
1b trayed section (or packed bed section)
1c column top
2 stripping column
2a column bottom
2b trayed section (or packed bed section)
2c column top
2d liquid withdrawal unit
2e liquid sump unit
3 heater (reboiler)
4 compressor 5 chimney tray for sump
6 pump
7 condenser
8 tube-bundle-type heat exchanger
5, 15 chimney tray for sump
9 chimney tray for sump
10, 12, 14 liquid
11, 13, 18 vapor
16 partition plate
17 control valve
21, 22, 23, 24, 25, 26, 27, 28, 29, 30, 31 pipe

The invention claimed is:

1. A heat integrated distillation apparatus comprising:
a rectifying column including a trayed section or a packed bed section, which is used as a rectifying section;
a stripping column located higher than the rectifying column and including a trayed section or a packed bed section used as a stripping section;
a first pipe for connecting a column top of the stripping column with a column bottom of the rectifying column;
a single compressor installed at a midway section of the first pipe and configured to compress vapor from the column top of the stripping column and then feed the compressed vapor to the column bottom of the rectifying column;
a heat exchanger located at the trayed section or packed bed section of the rectifying column;
a liquid withdrawal unit located at the trayed section or packed bed section of the stripping column and configured to remove a part of liquid from the trayed section or lacked bed section to the outside of the column;
a second pipe for introducing the liquid from the liquid withdrawal unit to the heat exchanger; and
a third pipe for introducing fluids introduced through the second pipe to the heat exchanger and then discharged from the heat exchanger to a stage directly below the liquid withdrawal unit.

2. The heat integrated distillation apparatus according to claim 1, further comprising a raw material supply pipe for supplying a raw material to at least one of the column top of the stripping column and one of the trayed section and the packed bed section.

3. A heat integrated distillation apparatus comprising:
a rectifying column including a trayed section or a packed bed section, which is used as a rectifying section;
a stripping column located higher than the rectifying column and including a trayed section or a packed bed section used as a stripping section;
a first pipe for connecting a column top of the stripping column with a column bottom of the rectifying column;
a compressor installed at a midway section of the first pipe and configured to compress vapor from the column top of the stripping column and then feed the compressed vapor to the column bottom of the rectifying column;
a liquid sump unit located at the trayed section or packed bed section of the stripping section and configured to hold liquid that has flowed downward;
a heat exchanger located in the liquid sump unit of the stripping column;
a partition plate that is set in the trayed section or packed bed section of the rectifying column and that is configured for complete partition of upper and lower stages;
a second pipe for introducing vapor below the partition plate to the heat exchanger; and
a third pipe for introducing fluids introduced through the second pipe to the heat exchanger and then discharged from the heat exchanger to an upper side of the partition plate.

4. The heat integrated distillation apparatus according to claim 3, further comprising a pipe, which includes a control valve, for connecting spaces, that are located up and down and that sandwich the partition plate, with each other.

5. The heat integrated distillation apparatus according to claim 4, further comprising a raw material supply pipe for supplying a raw material to at least one of the column top of the stripping column and one of the trayed section and the packed bed section.

6. The heat integrated distillation apparatus according to claim 5, further comprising a pump and a pipe for pressure-feeding liquid stored in the column bottom of the rectifying column to the raw material supply pipe.

7. The heat integrated distillation apparatus according to claim 3, further comprising a raw material supply pipe for supplying a raw material to at least one of the column top of the stripping column and one of the trayed section and the packed bed section.

* * * * *

UNITED STATES PATENT AND TRADEMARK OFFICE
CERTIFICATE OF CORRECTION

PATENT NO. : 8,440,056 B2
APPLICATION NO. : 13/386624
DATED : May 14, 2013
INVENTOR(S) : Masaru Nakaiwa et al.

It is certified that error appears in the above-identified patent and that said Letters Patent is hereby corrected as shown below:

In the Claims

In column 11 at line 33 in Claim 1, change "lacked" to --packed--.

Signed and Sealed this
First Day of October, 2013

Teresa Stanek Rea
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,440,056 B2 | Page 1 of 1 |
| APPLICATION NO. | : 13/386624 | |
| DATED | : May 14, 2013 | |
| INVENTOR(S) | : Nakaiwa et al. | |

It is certified that error appears in the above-identified patent and that said Letters Patent is hereby corrected as shown below:

In the Specification

In column 2 at lines 33-34, Change "fractionated," to --fractionated--.

In column 5 at line 46, Change "use" to --used--.

In column 5 at line 46, After "as" delete "is".

In column 5 at line 48, Change "use" to --used--.

Signed and Sealed this
Thirteenth Day of May, 2014

Michelle K. Lee
*Deputy Director of the United States Patent and Trademark Office*

UNITED STATES PATENT AND TRADEMARK OFFICE
CERTIFICATE OF CORRECTION

PATENT NO.         : 8,440,056 B2
APPLICATION NO.    : 13/386624
DATED              : May 14, 2013
INVENTOR(S)        : Masaru Nakaiwa et al.

Page 1 of 1

It is certified that error appears in the above-identified patent and that said Letters Patent is hereby corrected as shown below:

ON THE TITLE PAGE

In column 1, page 1, the name of the assignee should be changed from "Toyo Engineering Company" to –Toyo Engineering Corporation–.

Signed and Sealed this
Seventeenth Day of May, 2016

Michelle K. Lee
*Director of the United States Patent and Trademark Office*